(12) United States Patent
Wagner et al.

(10) Patent No.: US 7,410,034 B1
(45) Date of Patent: Aug. 12, 2008

(54) DRUM BRAKE

(75) Inventors: Robert Lee Wagner, Plymouth, IN (US); William E. Sherman, II, South Benduth, IN (US)

(73) Assignee: Robert Bosch GmbH, Stuttgart (DE)

( * ) Notice: Subject to any disclaimer, the term of this patent is extended or adjusted under 35 U.S.C. 154(b) by 304 days.

(21) Appl. No.: 11/306,940

(22) Filed: Jan. 17, 2006

(51) Int. Cl.
*F16D 65/38* (2006.01)
*F16D 51/00* (2006.01)

(52) U.S. Cl. .............. 188/73.37; 188/73.36; 188/73.38; 188/250 G

(58) Field of Classification Search .............. 188/73.36, 188/73.37, 73.38, 19.51, 79.55, 361, 362, 188/206 R, 250 E, 250 G
See application file for complete search history.

(56) References Cited

U.S. PATENT DOCUMENTS

| | | | | |
|---|---|---|---|---|
| 2,518,411 A | * | 8/1950 | Wilson | 188/335 |
| 3,187,849 A | * | 6/1965 | Deibel | 188/364 |
| 3,441,109 A | * | 4/1969 | Fisher et al. | 188/325 |
| 4,553,647 A | | 11/1985 | Spaargaren | 188/206 R |
| 5,246,093 A | | 9/1993 | Wang | 188/336 |
| 6,209,692 B1 | * | 4/2001 | Pels et al. | 188/381 |
| 6,234,278 B1 | | 5/2001 | Loken et al. | 188/70 R |
| 6,729,449 B1 | | 5/2004 | Doolitte et al. | 188/340 |
| 6,899,205 B2 | * | 5/2005 | Wang | 188/250 H |
| 7,104,370 B2 | * | 9/2006 | Wang | 188/340 |

* cited by examiner

*Primary Examiner*—Melody M Burch
(74) *Attorney, Agent, or Firm*—Leo H McCormick, Jr.; Sarah Taylor

(57) ABSTRACT

A parking brake including a disc fixed to a vehicle and a plurality of clips attached to the disc to align channels on first and second brake shoes with a braking surface on a drum. Each clip has a rectangular shape with a flat first end fixed to the disc and a U-shaped second end defined by parallel first and second sides separated by a spacer. A projection on the first end is mated with the disc to align the second end along a radial plane of the axis of the drum. The sides of the second end resiliently engage the channels and align friction surfaces on the first and second brake shoes with the braking surface. In addition, the clips attenuate any vibration that may occur between first and second brake shoes and the drum during movement of the vehicle to reducing the creation of noise in the brake.

3 Claims, 3 Drawing Sheets

DRUM BRAKE

This invention relates to a parking brake having first and second brake shoes that are resiliently aligned with a braking surface by clips attached to a disc that is fixed to a vehicle such that vibrations caused by movement of a vehicle over a rough road are dampened and the creation of noise in the brake system is attenuated.

BACKGROUND OF THE INVENTION

It is common to provide a vehicle with a parking brake such as the drum-in-hat brake disclosed in U.S. Pat. No. 5,180,037 as many of the components derived from conventional drum brakes, such as disclosed in U.S. Pat. Nos. 3,232,391; 6,328,141 and 6,394,237. In such drum brakes the first and second brake shoes are retained on a backing plate through the use of pins that extend through the web of the brake shoes. The pins allow the brake shoes some lateral movement within a brake drum during a brake application when a leading edge of the brake shoe engages the braking surface to allow an abutment surface on a trailing edge of second to be brought in engagement with an anchor to oppose the frictional engagement. On frictional engagement it is necessary that the first and second shoes be able to move, however some uneven wear patterns may occur as the webs are not held in alignment with the braking surface on the drum. U.S. Pat. No. 5,246,093 disclosed a brake wherein the web of a unitary brake shoe is retained on the backing plate by a clip member. In this brake, the friction surfaces are ground in a manner such that during a brake application the non-cylindrical surface of the friction material is expanded into a circular shape to function as a parking brake for a vehicle. Later a parking brake as disclosed in U.S. Pat. No. 6,729,449 was developed wherein channels on first and second brake shoes were located on radial guides that extended from an anchor to align friction surfaces thereon with the braking surface on the drum. This parking brake functions in a satisfactory manner, however during periods of travel of a vehicle over rough surfaces, it is possible that some vibration may occur and as a result noise may be introduced into the brake system.

SUMMARY OF THE INVENTION

It is an object of this invention to provide a simple and effective drum brake wherein a channel on a brake shoe is resiliently retained by clips fixed to a disc and aligned with a braking surface on a drum such that vibrations that may be introduced into the brake system by movement of a vehicle over uneven terrain and create noise in a brake system are reduced.

According to this invention, a parking brake assembly includes a drum that is rotatable about an axis of a vehicle with an inner cylindrical surface thereon that defines a braking surface for first and second friction surfaces located on first and second brake shoes. The first and second brake shoes are respectively moved by an actuation member from positions of rest against first and second radial abutments on a disc and into frictional engagement with the braking surface to effect a brake application. The first brake shoe has a first arcuate channel member that is retained on a first plurality of guides such that a first end thereon is aligned with the actuation member and the first radial abutment and a second end thereon is aligned with an adjuster assembly. Similarly, the second brake shoe has a second arcuate channel member that is retained on a second plurality of guides such that a first end thereon is aligned with the actuation member and the second radial abutment and a second end thereon that is aligned with the adjuster assembly. Springs are connected to the first and second arcuate channels such that the first ends thereon are urged into engagement with the actuation member and the second ends thereon are urged into engagement with the adjuster assembly. The actuation member on receipt of an input force acts on the first end of the first arcuate channel and the first end of the second arcuate channel and moves the first end of the first channel away from the first radial abutment and the first end of the second channel away from the second radial abutment to bring a leading edge of one of the first and second friction surfaces thereon into frictional engagement with the braking surface. On engagement of the leading edge with the braking surface, the first and second brake shoes rotate with the drum and return the first end of the arcuated channel of the leading edge into engagement with its corresponding radial abutment to resist the rotation of the drum during a brake application. The first and second plurality of guides are characterized by clip members each of which have a substantially rectangular shape with a first end and a second end wherein the first end has a flat surface that defines a base while the second end has a U-shape defined by parallel first and second sides separated by a spacer. The first and second sides of the second end of the clips engage the first and second arcuate channels and maintain the first and second friction surfaces thereon in axial alignment with the braking surface during a brake application while resiliently attenuating of any vibration introduced into the brake system during travel of the vehicle over uneven terrain and they reduce the creation of noise in a brake system.

An advantage of this invention for a parking brake resides in the manner in which the channels of a brake shoe are resiliently retained to permit radial movement while attenuating axial movement of the brake shoe.

Another advantage of this invention for a parking brake resides in a reduction in the overall volume and weight of an anchor through the use of clips for aligning a friction member on a brake shoe with a braking surface of a drum.

DETAILED DESCRIPTION OF THE INVENTION

In the description that follows, components of the drum brake that identical may be identified by a same number plus ' unless necessary to better describe a functional relationship with another component.

Figure 1:
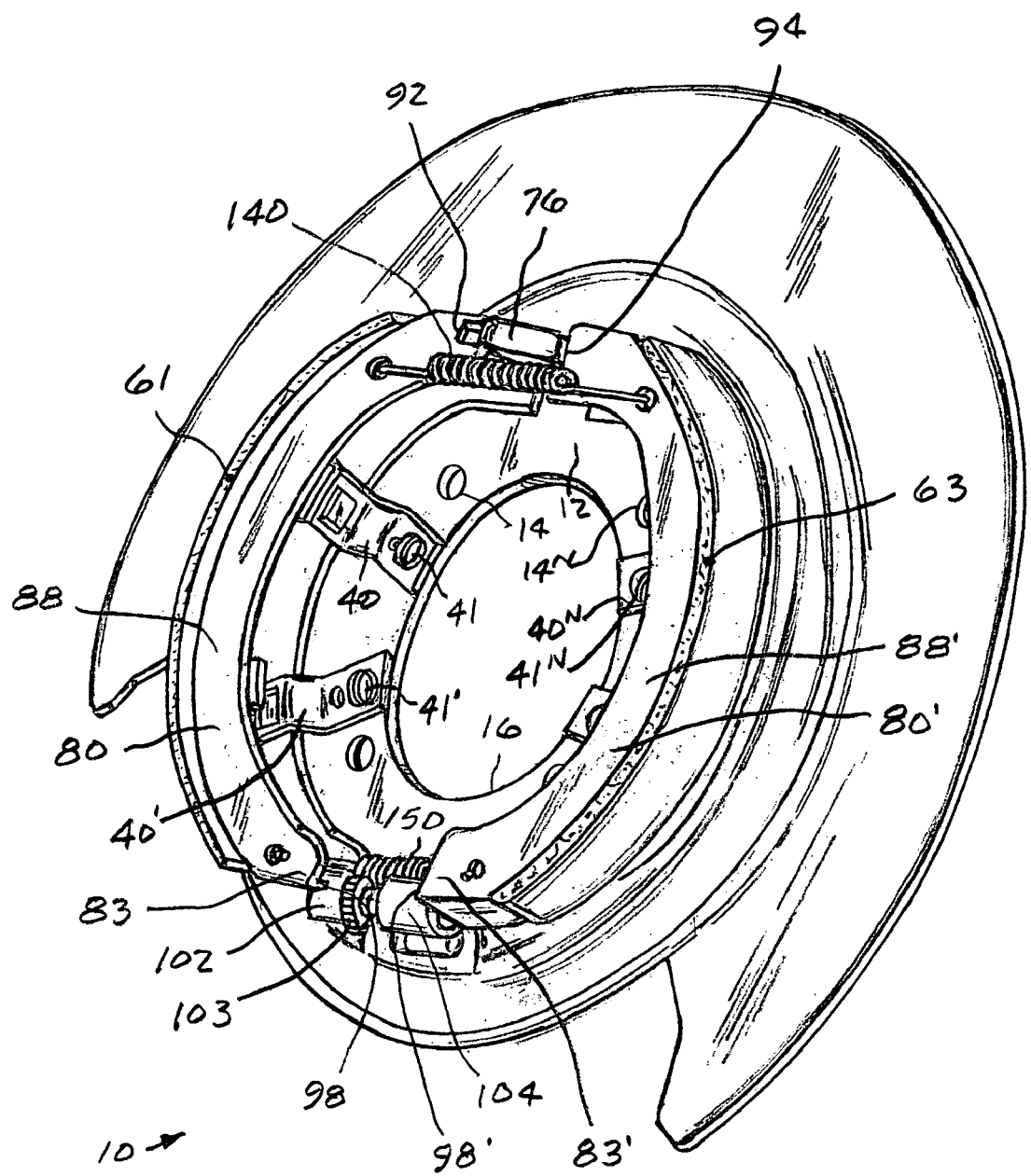
FIG. 1 is a perspective illustration of a parking brake having a plurality of clips attached to a disc for aligning first and second brake shoes with a braking surface on a drum in accordance with the present invention.
Figure 2:
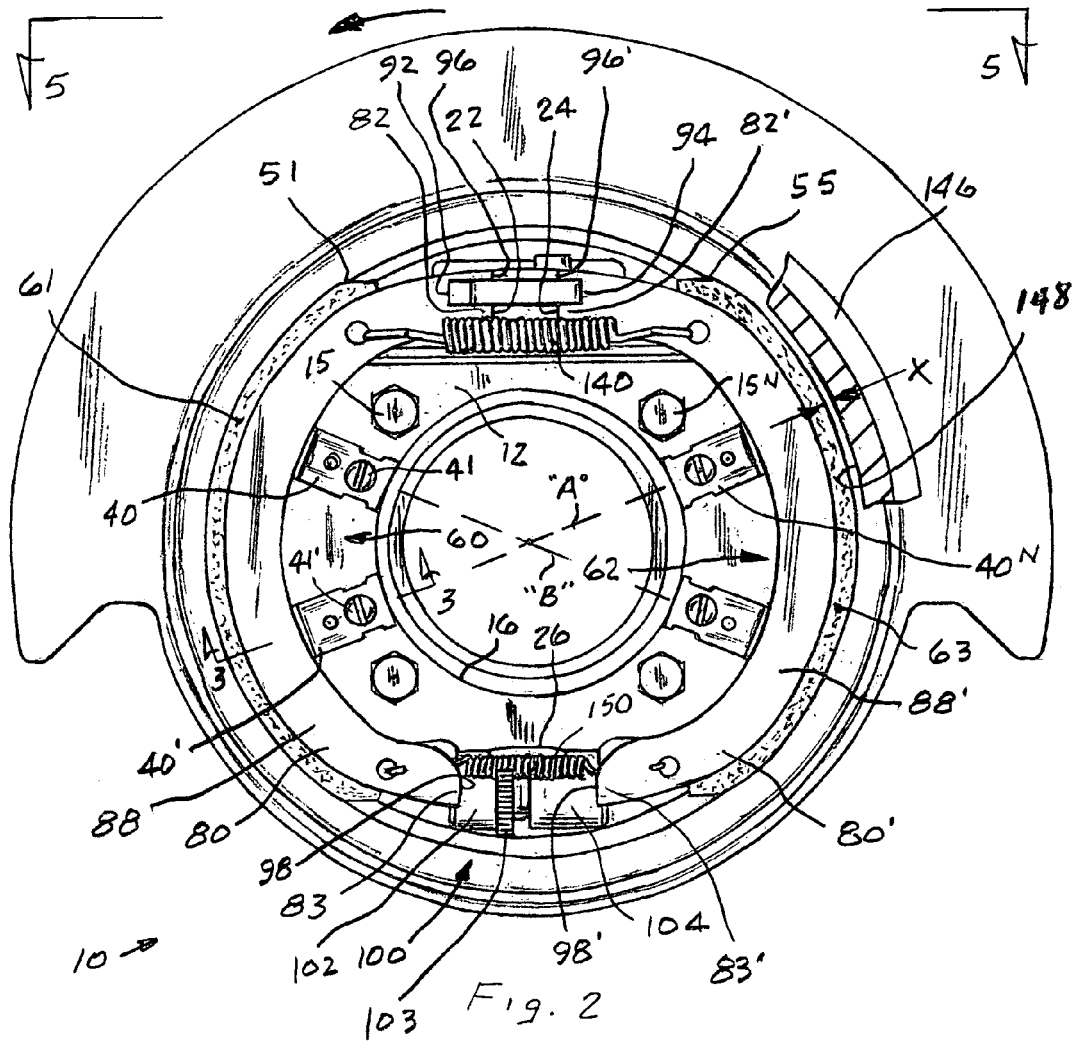
FIG. 2 is a front elevation view of the parking brake of FIG. 1 showing a relationship with a drum.
Figure 5:
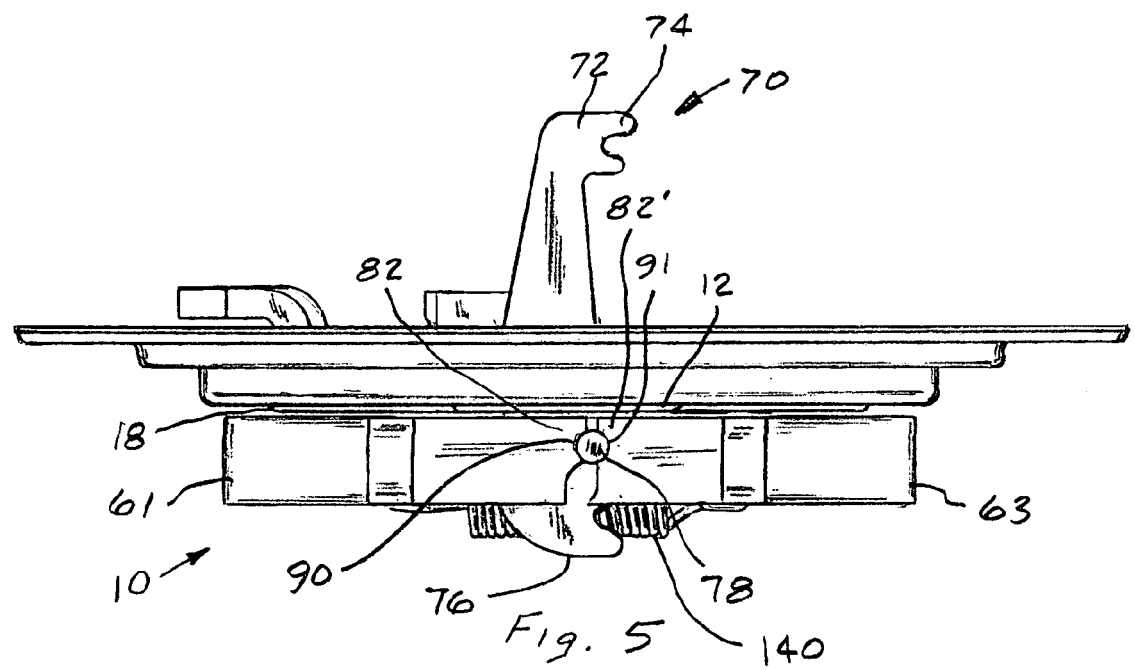
FIG. 5 is a top view taken along lines 4-4 of FIG. 2 showing the actuation member for the parking brake.

The parking brake 10 illustrated in FIGS. 1, 2 and 5 is made according to the present invention and intended for use as a parking brake for a vehicle. The parking brake 10, commonly referred to as a drum-in-hat brake, includes a drum 146 that is rotatable about an axis of an axle shaft that has an inner cylindrical surface 48 that defines a braking surface for first 61 and second 63 friction members respectively positioned on first 60 and second 62 brake shoes that are moved by an actuation member 70 from a position of rest to effect a desired brake application.

Figure 3:
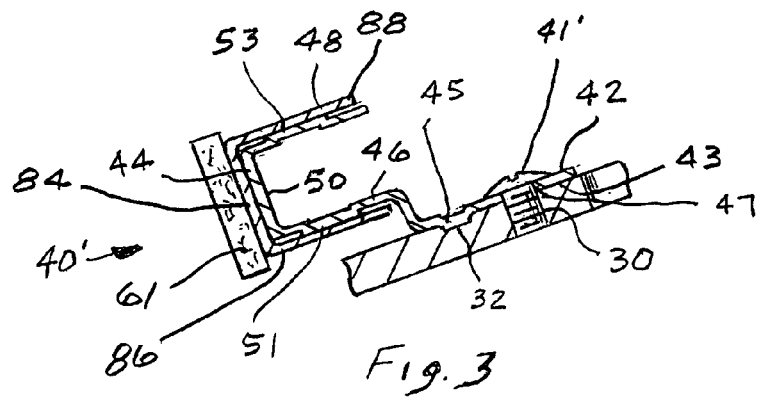
FIG. 3 is a sectional view of a clip taken along lines 3-3 of FIG. 2.

In more detail, the parking brake 10 includes a disc 12, see FIGS. 1 and 2 that is fixed to a vehicle by bolts that extend through openings 14, 14' . . . 14n in a disc 12. The disc 12 is essentially a flat plate with a center opening 16 therein through which an axle shaft of the vehicle passes having a peripheral surface 18 with uniform radius except for a first axial abutment 22 and a second axial abutment 24 and a flat 26 opposite the first 22 and second 24 axial abutments to accommodate an adjuster assembly 100. With the disc 12 fixed to the vehicle, the first axial abutment 22 and the second axial abutment 24 function as an anchor for receiving braking forces during a brake application. The disc 12, is further defined by a plurality of openings 30 and corresponding grooves or indentations 32 (only one is shown in FIG. 3) that are located along a first radial plane "A" and a second radial plane "B" with respect to the axis of center opening 16. The first A and second B radial planes are equally located between the openings 14, 14' . . . 14n and neither pass through the first 22 and second 24 abutments or flat 26 on the disc 12.

Figure 4:
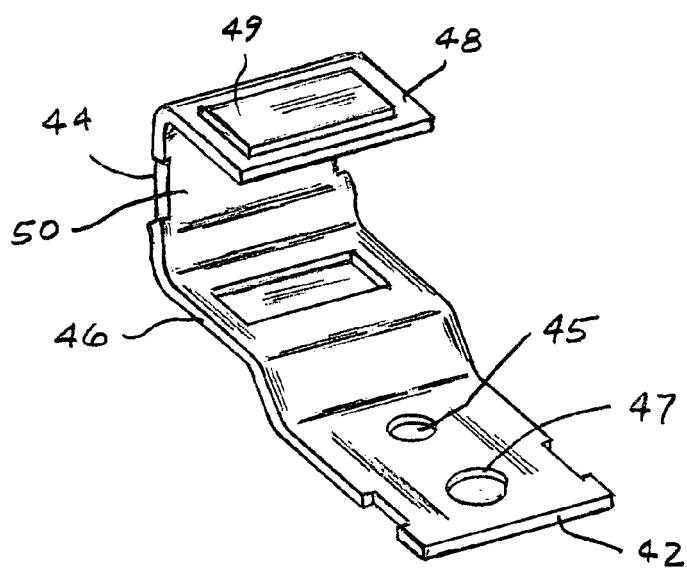
FIG. 4 is a perspective view of the clip of FIG. 3.

A plurality of clips 40,40' . . . 40n are attached to the disc 12 to define first and second guides for the alignment of the first 60 and second 62 brake shoes with respect to the braking surface 148 on drum 146. In more particular detail, each clip 40 has a substantially rectangular shape with a first end 42 having a flat surface 43 that defines a base with a projection 45 located adjacent an opening 47 and a second end 44 with parallel first 46 and second 48 sides that are separated by a spacer 50 to define a U-shape, see FIGS. 3 and 4. The parallel first 46 and second 48 sides are offset from the base by a distance such that the flat surface 43 is located on disc 12 while the second end 44 is positioned to respectively align friction members 61,63 on brake shoes 60, 62 in a desired radial plane on drum 46. The parallel first 46 and second 48 sides on each clip of the plurality of clips 40,40' . . . 40n are further characterized by rectangular projections 51 and 53 that extend there from and provide limited contact points with arcuate channels 80, 80' on brake shoes 60, 62. The clips 40,40' . . . 41n are selective fixed to the disc 12 by a screws 41, 41' . . . 41n that pass through each opening 47 and are inserted into a corresponding 30 in disc 12 such that the projection 45 adjacent each opening 47 is located in an indentation or slot 32 in disc 12 and as a result the first 46 and second 48 sides of each clip are parallel to the disc 12.

The first and second brake shoes 60 and 62 as shown in FIGS. 1, 2 and 3 are identical and similar to the brake shoes disclosed in U.S. Pat. No. 6,729,449 in that each brake shoe 60, 62 has a U shaped arcuate channel 80,80' defined by a base 84 and first 86 and second 88 sides that extend from a first end 82 to a second end 83. The first end 82 and second end 83 each have complementary indentations and slots therein and as a result a channel has no top or bottom and equally function in a desire manner when installed on disc 12 in that the indentations and slots on the first end 82 and second end 83 may receive either a flat lever 72 and cam surface 76 of actuator 70 or the end members 102 and 104 of the adjuster assembly 100. The channels 80,80' for brake shoes 60,62 are placed on a clips 40, 40' . . . 40n such that the rectangular surface 51 on the first side 46 and rectangular surface 53 on the second 48 side resiliently engage channel 80 or 80' as illustrated in FIG. 3 for clip 40' with respect to channel 80. Thus, the channels 80, 80' are resiliently restrained against axially movement by the parallel point side engagements that hold the friction members 61, 63 on brake shoes 60, 62 in parallel alignment with the braking surface 148 on the drum 146.

The actuator 70, as shown in FIG. 5 is defined by a rectangular flat lever 72 with a hooked end 74 on a first end and a cam surface 76 on a second end with a pin 78 located at a desired pivot point. The flat lever 72 is respectively located in abutting linear slots 92,94 and 92', 94' in channels 80 and 80' such that pin 78 is retained between the first indentation 90 on brake shoe 60 and indentation 91' on brake shoe 62.

The adjuster assembly 100, as illustrated in FIG. 1, has a first end member 102 that is connected to the second end 83 of channel 80 of brake shoe 60 and a second end 104 that is connected to the second end 83' of channel 80' of brake shoe 62. The first end member 102 and the second located 104 are rectangular in shape and respectively abut the reaction surfaces 98,98' adjacent the second ends 83, 83' of channels 80, 80'. The first end member 102 receives a first smooth end of shaft attached to a star wheel linkage 103 while a second end of the shaft is threaded into the second end member 104. The linear distance between the first end member 102 and the second end member 104 may be changed by rotating the star wheel linkage 103 that is free to turn in the first end member 102 but translates with respect to the threads in the second end member 104 to expand the distance between the first end member 102 and the second end member 104.

Method of Assembly

The parking brake 10 is designed such that a portion would be assembled by a first supplier and shipped to vehicle manufacturer for installation on a vehicle. The initial sub-assembly of the parking brake 10 could be achieved through the following steps:

a disc 12 is obtained from a source and characterized by an central opening 16, a peripheral arcuate surface 18, first 22 and second 24 axial abutments, mounting openings 14, 14' . . . 14n, and complementary openings 30 and indentations or slots 32 located in a first radial plane "A" and a second radial plane "B";

a plurality of clips 40, 40' . . . 40n are obtained from a source, each clip being characterized by a substantially rectangular shape with a first end 42 with a flat surface 43 that defines a base and an outward projection 45 that extends from the flat surface that is located adjacent an opening 47 and a second end 44 having a U-shape defined by parallel first 46 and second 48 sides that are separated by a spacer 50 and raised rectangular projections or surfaces 51 and 53 that respectively extend from the first 46 and second 48 sides;

the plurality of clips 40, 40' . . . 40n are selectively fixed to the disc 12 by a screw 41 that passes through the opening 47 in each clip 40 and inserted into corresponding openings 30 in the disc 12 such that the projection 45 is located in a groove or indentations 32 and clips 40, 40''' are located in a first radial plane A and clips 40', 40n are second radial plane B;

identical first 60 and second 62 brake shoes, each having a web defined by an arcuate channel 80, 80' are obtained from a source. Each arcuate channel 80,80' has a base 84 and parallel first 86 and second 88 side walls that extends from a first end 82 to a second end 83 with a first reaction surface 96,96' located adjacent the first end 82 and a second reaction surface 98,98' located adjacent the second end 83. The base 84 has a first radial indentation adjacent the first side 86 on the first end 82 and a second radial indentation adjacent the second side 88 on the second end 83. The first 86 and second 88 sides have first linear slots that extends a first distance from the first end 82 and second linear slots that extends the same distance from the second end 83. The first end 82 and the second end 83 are identical and complementary as a result either end may be installed on disc 12 to effectively function in effecting a brake application;

the arcuate channel 80 on the first brake shoe 60 is placed on the first 40 and second 40' clips such that the rectangular surfaces 51 and 53 on the first 46 and second 48 sides of the clips resiliently engages the first 86 and second sides 88 and the first end 82 is aligned with the first axial abutment 22;

the arcuate channel 80' on the second brake shoe 62 is placed is placed on the third 40" and fourth 40*n* clips such that the rectangular surfaces 51 and 53 on the first 46 and second 48 sides of the clips resiliently engages the first side 86' and second side 88' and the first end 82' is aligned with the second axial abutment 24;

an adjuster assembly 100 is obtained from a source that includes a first end member 102 that is separated from a second end member 104 by a star-shaft linkage 103;

the first end member 102 of the adjuster assembly 100 is located in the linear slots in the arcuate channel 80 of the first brake shoe 60 such that the first end member 102 engages reaction surface 98 on the second end 83;

the second end 104 of the adjuster assembly 100 is located in the linear slots in the arcuate channel 80' of the second brake shoe 62 such that the second end member 104 engages reaction surface 98' on the second end 83';

a lever 72 is obtained from a source that has a rectangular body with a hook 74 on a first end and a cam surface 76 on a second end and a pin 78 located at a desired pivot point adjacent the cam surface 76;

the lever 72 is located in the first radial slots on the first end 82 of the first arcuate channel 80 and the first linear slots in the first end 82' of the second arcuate channel 80' with the pin 78 being retained between indentations 90,91; and a first spring 140 and a second 150 spring are attached to wall 88 of the first arcuate channel 80 and wall 88' of the second arcuate channel 80' to respectively urge the first end 82 toward the first axial abutment 22 and the first end 82' toward the second axial abutment 24 and the second end 83 toward end member 102 of the adjuster assembly 100 and first end 83' toward end member 104 of the adjuster assembly 10 to complete the sub assembly of the first 60 and second 62 brake shoes on the disc 12.

The sub-assembled disc 12 with brake shoes 60 and 62 attached thereto is now sent to the vehicle manufacture for installation on a vehicle. As shown in FIG. 2, the disc 12 is fixed to a member on the vehicle by bolts 15, 15' . . . 15*n* that pass through openings 14, 14' . . . 14*n* in disc 12 to align an axle opening with the central opening 16. A rotor which is part of a disc brake assembly is attached to an axle that extends though opening 16 such that an inner cylindrical surface of the rotor defines a drum 146 having a braking surface 148 for the first 61 and second 63 friction members that are respectively located on the first brake shoe 60 and the second brake shoe 62 retained on disc 12. After the rotor is attached to the axle, an actuation cable is attached to the hooked end 74 of actuator lever 72 and a running clearance "x" is set between the 61 and 63 friction members and braking surface 148 on drum 146. The running clearance is set by applying a torque to the star-wheel 103 to rotate the threaded shaft with respect to the second end 104 and move the first end member 102 and the second end member 104 away from each other and correspondingly the second end 83 on the first arcuate channel 80 on brake shoe 60 and the second end 83' on the second arcuate channel 80' such that the first friction surface 61 and the second friction surface 63 are located at a desired running clearance "x" from braking surface 148.

MODE OF OPERATION OF THE INVENTION

For purposes of describing the functional relationship of the components of parking brake 10 during a brake application it is assume that drum 146 is turning in a counter clockwise direction.

To initiate a brake application, an input force is applied to lever 72 that is located in the linear slots in the first end 82 of channel 80 and the linear slots in the first end 82' of channel 80' such that lever 72 pivots about pin 78. Movement of the hooked end 74 of lever 72 causes cam surface 76 to engage the first end 82 of arcuate channel 80' and as a result the first end 82 of channels 80 and the first end 82' of channel 80' move away from the reactions surfaces defined by the first 22 and second 24 axial abutments on disc 12. When a leading edge 51 on the first friction member 61 engages braking surface 148, the first channel 80 and second channel 80' rotate together as a unit in the same counter clockwise direction such that the first end 82 on arcuate channel 80 continues to move away from the first radial abutment 22 while the first end 82' on arcuate channel 80' associated with a trailing edge 55 of friction member 63 is returned to engagement with the second radial abutment 24 to oppose a force generated through the engagement of the first 61 and second 63 friction members with the braking surface 148 in opposing the rotation of drum 146 to effect a brake application. The rectangular contact surfaces 51 and 53 on the first 46 and second 48 sides of the plurality of clips 40, 40' . . . 40*n* resiliently engages the first 86, 86' and second 88,88' sides of the channels 80,80' to maintain the parallel alignment of the friction members 61,63 with the braking surface 148 on the drum 146.

When the force is removed from the actuator member 70, the return springs 140,150 return the brake shoes 60, 62 to the position of rest with clearance "x" between the friction members 61,63 and the braking surface 148.

When a vehicle is traveling over a rough terrain it is possible to introduce vibration into the brake system, the resilient relationship established between the first rectangular contact surfaces 51 and 53 on the on the first 46 and second 48 sides of the plurality of clips 40, 40' . . . 40*n* dampens the vibrations such that audible noise is essentially eliminated as a result of such movement as each clip in the plurality of clips 40, 40' . . . 40*n* vibrates independently and not in harmony with each other.

What is claimed is:

1. A brake assembly for a vehicle having a drum that is rotatable about an axis with an inner cylindrical surface thereon that defines a braking surface for first and second friction members respectively located on first and second brake shoes that are moved by an actuation member from positions of rest against first and second radial abutments on a disc into frictional engagement with the braking surface to effect a brake application, said first brake shoe having a first arcuate channel that is retained on a first plurality of guides such that a first end thereon is aligned with the actuation member and the first radial abutment and a second end thereon is aligned with an adjuster assembly, said second brake shoe having a second arcuate channel that is retained on a second plurality of guides such that a first end thereon is aligned with the actuation member and the second radial abutment and a second end thereon that is aligned with the adjuster assembly, spring means connected to said first and second arcuate channels for urging the first ends thereon into engagement with the actuation member and the second ends thereon into engagement with the adjuster assembly, said actuation member on receipt of an input force acting on the first end of the first arcuate channel and the first end of the second arcuate channel and moving the first end of the first channel away from the first radial abutment and the first end of the second channel away from the second radial abutments to bring a leading edge of one of said first and second friction members thereon into frictional engagement with the braking surface causing the first and second brake shoes to rotate with the drum and return the first end of the arcuate channel of a trailing edge to engagement with its corresponding radial abutment to resist the rotation of the drum during a brake application, said first and second plurality of guides being characterized by resilient engagement with the first and second arcuate channels while maintaining the first and second friction surfaces thereon in axial alignment with the braking surface and attenuating of any vibration of the first and second brake shoes with respect to the drum that may occur with movement of the vehicle over a rough road to reduce the creation of noise caused by such vibration, said resilient engagement of said first and second plurality of guides with the first and second arcuate channels permits radial movement of the first and second friction surfaces during a brake application, said first and second guides includes a plurality of clips each of which have a substantially rectangular shape with a first end and a second end, said first end having a flat surface that defines a base while the second end has a U-shape defined by parallel first second sides separated by a spacer with said first side being offset from the base by a distance such that a channel may radially move thereon without engaging the disc, said base of each clip having an opening with a projection that extends there from with the base being secured to the disc by a fixing member that extends through the opening while the projection is mated with an indentation in the disc such that the second end of each clip of the plurality of clips is aligned along a radial plane with respect to the axis of the drum and said first and second parallel sides of each clip have a raised surface that engages a corresponding channel in point contact, said point contact reducing the transmission of vibration between a brake shoe and the disc and yet maintain radial alignment between the friction members on a brake shoe and the braking surface.

2. The brake assembly as recited in claim 1 wherein the first plurality of guides include first and second clips that are located on complementary planes with first and second clips of the second plurality of guides to uniformly align the first and second channels with respect to the drum.

3. The brake assembly as recited in claim 2 wherein said plurality of clips independently vibrate and do not vibrate in harmony to further reduce the development of noise in a brake system.

* * * * *